Sept. 4, 1951 E. Y. ROBERTS 2,567,124
AIRFOIL CONSTRUCTION
Filed May 10, 1946 2 Sheets-Sheet 1
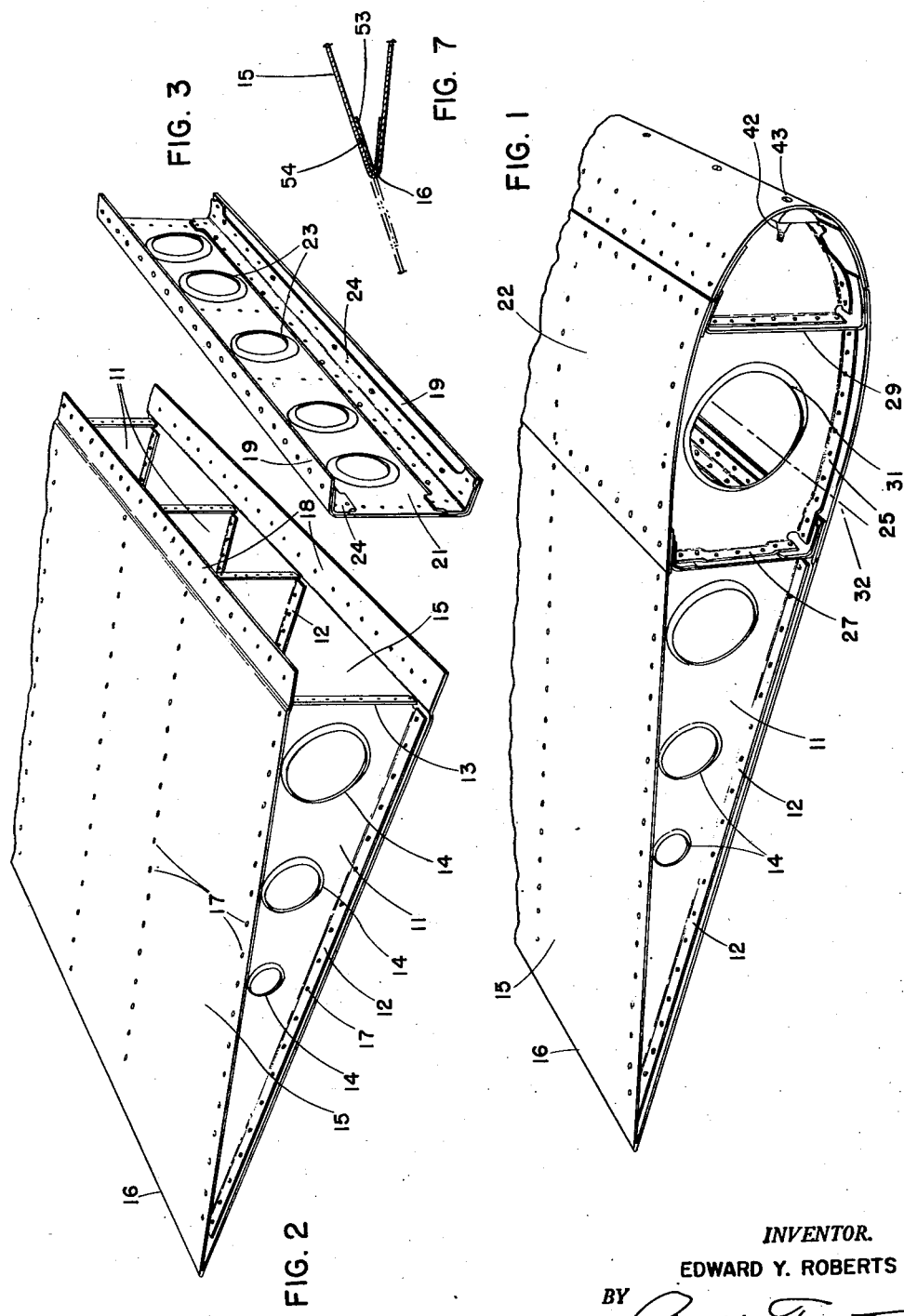
INVENTOR.
EDWARD Y. ROBERTS
BY
*Richard W. Treverton*
ATTORNEY Sept. 4, 1951  E. Y. ROBERTS  2,567,124
AIRFOIL CONSTRUCTION
Filed May 10, 1946  2 Sheets-Sheet 2
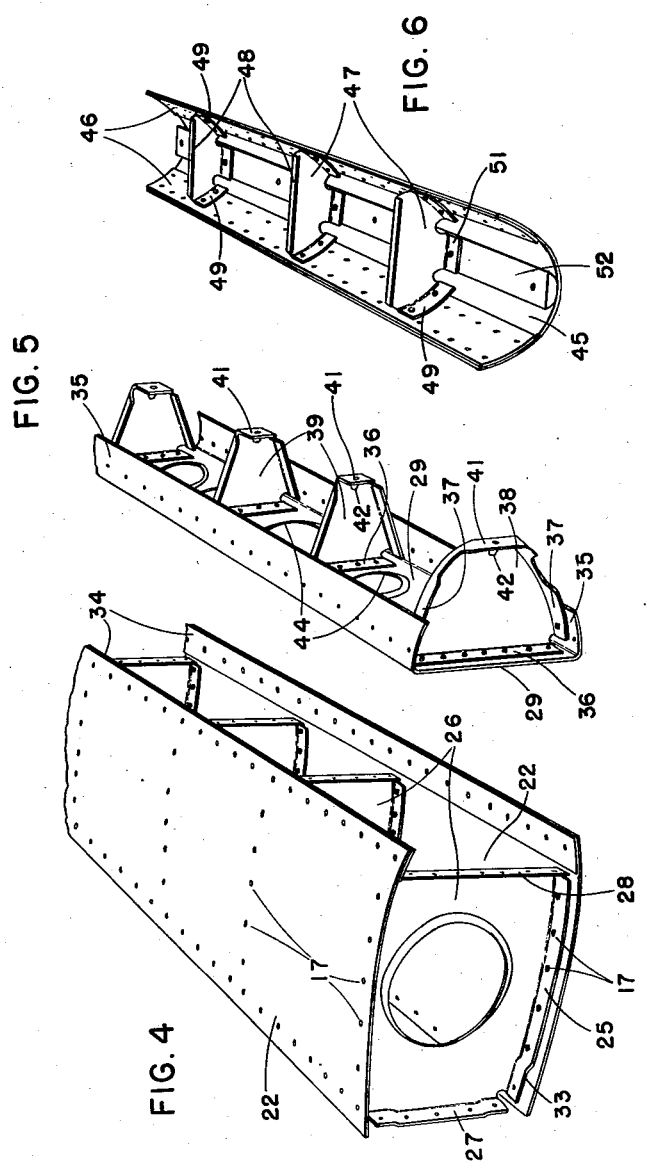
INVENTOR.
EDWARD Y. ROBERTS
BY
*Richard W. Treverton*
ATTORNEY Patented Sept. 4, 1951

2,567,124

UNITED STATES PATENT OFFICE 2,567,124

AIRFOIL CONSTRUCTION

Edward Y. Roberts, Findlay, Ohio, assignor to Curtiss-Wright Corporation, a corporation of Delaware Application May 10, 1946, Serial No. 668,907

9 Claims. (Cl. 244—124)

The present invention relates to aircraft and particularly to an improved airfoil construction built up from sheet metal members.

In the construction of airfoils such as wings, ailerons, elevators, trim tabs and the like, wherein a supporting structure is provided with a covering or skin of thin sheet metal, it has frequently been necessary to utilize blind fastenings such as explosive rivets or mechanically expanded rivets or bolts to secure certain of the component parts. It has also been customary to provide at the trailing edge of the airfoil an edge strip to which the skin has been attached by riveting or the like.

According to the present invention an airfoil may be built up of sheet metal sections fabricated in such a manner that ordinary rivets or other usual fastening means may be employed throughout. The aft portion of the airfoil preferably comprises a sheet of metal bent upon itself at the trailing edge to constitute the upper and lower covering or skin. To this aft section are progressively secured fore sections of the airfoil, access to the inner ends of rivets or other fastening means being gained through the forward open face of the structure, whose leading edge is finally closed by a nose cap.

In a preferred form of the invention, as applied to a pivoted airfoil which has to be balanced, means are provided in the nose cap for accommodating ballast and for utilizing such ballast as a structural member of the airfoil assembly.

The foregoing and other objects and advantages of the invention will become apparent from the following description of the typical embodiment thereof shown in the accompanying drawings, wherein:

Fig. 1 is a perspective view illustrating a fragment of an airfoil assembly, in this instance an elevator;

Figs. 2 and 3 are similar views of an aft section and rear spar section, respectively, of the airfoil of Fig. 1;

Figs. 4, 5 and 6 are similar views of a center section, fore section and nose cap, respectively, of the airfoil shown in Fig. 1; and, Fig. 7 is a fragmentary sectional view of a modified airfoil trailing edge.

As shown in the drawings the aft section of the airfoil may comprise spaced ribs 11 each formed of sheet metal with upper and lower edge flanges 12 and forward edge flanges 13. In order to lighten their weight a series of flanged openings or lightening holes 14 may be formed in each rib. Extending over the ribs and constituting upper and lower skin of the section is a sheet of metal 15, return bent at 16 to form the trailing edge. The skin 15 is secured to the rib flanges 12 by suitable means indicated at 17. In the event rivets are employed the inner ends thereof may be backed by a suitable anvil entered through the now open forward face of the structure. In the event spot welding is employed for effecting the fastening indicated at 17, one electrode may be entered into the section interior through this face, or if another type of fastening is utilized, access thereto may also be gained in this manner.

The forward edge portions of skin 15 extend forwardly beyond ribs 11, as indicated at 18, to overlie forwardly extending flanges 19 of a sheet metal spar 21, and to underlie upper and lower skin 22 of the center section. As shown in Fig. 3 the web of the spar may be provided with flanged lightening holes 23 and reinforcing angle strips 24 secured thereto by any suitable means.

The upper and lower skin 22 of the center section shown in Fig. 4 is connected by fastening means 17 to upper and lower flanges 25 of spaced center section ribs 26. The latter may also have rear edge flanges 27 secured to the web of spar 21 and flanges 13 of the aft section ribs, and front edge flanges 28 secured to the web of a front spar or fore section spar 29. Ribs 26 may have flanged holes 31 formed therein for receiving means (not shown) by which the airfoil may be pivoted about an axis indicated at 32 as well as for lightening the structure. It will be noted that the aft ends of rib flanges 25 are offset from the plane of adjacent portions thereof to provide spaces 33 between the flanges and skin sections 22 for receiving the flanges 19 of spars 21 and the forwardly projecting portions 18 of aft section skin 15. Access for backing rivets connecting aft rib flanges 13, spar web 21, and center section rib flanges 27 may be had through openings 23.

The skin 22 of the center section extends forwardly beyond the fore edges of ribs 26, the forward extensions being reinforced by strips 34 which overlie flanges 35 of spar 29. Secured to the latter are flanges 36 and 37 of fore section ribs 38 and compression members 39, which also have forward edge flanges 41. Carried by the latter are locking units 42 for fasteners 43 which connect the nose cap of Fig. 6 to the airfoil proper. As may be seen from Figs. 1, 4 and 5 the fore section shown in Fig. 4 may be secured to the center section of Fig. 4 by rivets or other fastening means joining in overlapped relation skin 22, reinforcing strips 34 and flanges 35; and fastening means joining in overlapped relation center section rib flanges 28, the web of spar 29, and fore section rib flanges 36. Access to the interior ends of the latter fastening means may be had through lightening holes 44 in the front spar.

The nose cap shown in Fig. 6 comprises an outer shell 45 whose edges are reinforced by strips 46 and which has supporting ribs 47 with rear flanges 48 for abutment with the web of spar 29 at points between ribs and compression members 38 and 39. The cap ribs have upper and lower flanges 49 secured to the shell and forward flanges 51 spaced from the nose of the shell to provide spaces for receiving a ballast strip 52. The latter may be formed of lead or other heavy metal, in order to balance the airfoil about axis 32, and may extend along the nose of the shell to reinforce the latter, being secured thereto if desired by the same fasteners 43 which connect the nose cap to the airfoil. By this arrangement interchanges of ballast strips to compensate for desired variations in balance may be easily accomplished upon removal of the nose cap.

In fabricating the airfoil, the five sections shown in Figs. 2 to 6 respectively are each assembled and the parts each secured together as hereinbefore described. The rear spar of Fig. 3 is applied to the aft section shown in Fig. 2, and then rib flanges 13 and 27 of the aft and center sections are secured by fastening means extending through the web of spar 21, access being provided through the open forward face of the center section and holes 23. Through access gained through the open forward face of the center section fasteners may be applied securing in overlapped relation the rear edges of skin sections 22, skin portions 18, spar flanges 19 and center section rib flanges 26.

Next the fore section of Fig. 5 is assembled with the center section, and fasteners extended through rib flanges 28, spar web 29 and fore section flanges 36 through access gained through openings 44. The overlapping portions of skin 22, reinforcing strips 34 and spar flanges 35 may also be secured together at this stage. Lastly the nose cap is secured in place by fasteners 43 with the edges of shell 45 in substantial abutment with the forward edges of the center section skin, with the flanges 48 of the cap ribs in abutment with the web of spar 29, and with the flanges 41 of ribs and compression members 38 and 39 in abutment with ballast or reinforcing strip 52.

In order to reinforce the trailing edge of the airfoil which is necessary in some cases, a strip of sheet metal stock may be spot welded or otherwise be secured therealong as shown in Fig. 7. In accordance with the invention the metal strip, designated 53, is spot welded or otherwise fastened at 54 to the metal sheet 15 before the latter is return bent at 16 to provide upper and lower trailing edge surfaces. The sheet and strip, in the relationship indicated by broken lines in Fig. 7, after being secured together are simultaneously deformed to the return-bent condition depicted in full lines in the drawing, the simultaneous bending being effected in one or more operations. By securing the strip 53 to the sheet 15 only along one side of the line of bend stretching of the sheet or buckling of the strip during the forming operation is obviated.

It will be seen that the construction described provides a strong and light-weight airfoil which may be made almost entirely of sheet metal if desired, without the use of blind fasteners; access being provided by forward openings available as the fabrication proceeds. It will also be understood that the necessity for a trailing edge strip is obviated by return bending of the aft section skin; and that the arrangement of the fore section and nose cap ribs or compression members provides a light-weight and strong leading edge construction which, if desired, may be readily detached to interchange ballast strips 52 or for other purposes.

It will be understood further that the structure herein shown and described is merely illustrative of the inventive principles involved, and that these principles may be otherwise embodied without departing from the spirit of the invention or the scope of the appended claims.

I claim:

1. An airfoil construction comprising a spar having a web and forwardly extending flanges, and metallic skin overlying and secured to said flanges, a plurality of spaced nose ribs having flanges at their rear edges secured to said web; a nose cap comprising a shell and spaced ribs having flanges secured to the shell, the rear edges of the shell being in substantial abutment with the forward edges of the skin, cap ribs being disposed between adjacent nose ribs and having flanges abutting the spar web; a ballast strip secured to the cap between the cap ribs and shell, said strip abutting forward flanges of the nose ribs; and fasteners extended through the shell, strip and forward flanges of the nose ribs for securing the cap to the airfoil.

2. An airfoil construction comprising a spar having a web and forwardly extending flanges, and metallic skin overlying and secured to said flanges, a plurality of spaced nose ribs secured to the spar and having flanges at their forward ends; a nose cap comprising a shell with rear edges in substantial abutment with the forward edges of said skin and a plurality of supporting cap ribs therefor, said cap ribs being disposed in spaced relation to the nose ribs and having at their rear edges flanges abutting the spar web; and a ballast strip disposed between the shell and cap ribs and abutting the flanges at the forward ends of the nose ribs.

3. An airfoil construction comprising a spar and a plurality of spaced nose ribs secured thereto, a nose cap comprising a shell and a plurality of spaced ribs secured thereto, and a ballast strip disposed between the shell and cap ribs, the fore edges of the nose ribs having flanges abutting the ballast strip and the rear edges of the cap ribs having flanges abutting the spar.

4. An airfoil construction comprising a main section and a cap section attachable as a unit to the main section; the main section having a vertically extending web with upper and lower flanges, upper and lower skin secured respectively to said upper and lower flanges and terminating short of the forward edges of the latter, and a plurality of spanwise spaced compression members secured to and extending forwardly from the web; the cap section comprising a shell having a rounded nose and rearwardly directed upper and lower portions which respectively overlie and underlie the upper and lower spar flanges and which abut the forward edges of said skin, a reinforcing member secured along the interior of the nose of the shell, and ribs extending between and secured to the rearwardly directed portions of the shell, said ribs abutting the reinforcing member and the web, and the reinforcing member abutting the forward edges of said compression members; and fastening means extending through the shell and reinforcing member and into the compression members for securing the cap section to the main section.

5. An airfoil construction comprising a main section and a cap section attachable as a unit to the main section; the main section having upper and lower surface portions and a verticaly extending web, and a plurality of spanwise spaced compression members secured to and extending forwardly from the web; the cap section comprising a shell having a rounded nose and rearwardly directed upper and lower portions which respectively overlie and underlie said upper and lower surface portions, a strip secured along the interior of the nose of the shell, and ribs extending between and secured to the rearwardly directed portions of the shell, said ribs bearing upon said strip and said web, and said strip bearing upon the forward portions of said compression members; and fastening means extending through the shell and strip and into the compression members for securing the cap section to the main section.

6. An airfoil construction comprising a main section and a cap section attachable as a unit to the main section; the main section having an upright web and a plurality of spanwise spaced compression members secured to and extending forwardly therefrom; the cap section comprising a shell having a rounded nose and rearwardly directed upper and lower portions which respectively merge into the contour of the upper and lower surfaces of the main section, a strip secured along the interior of the nose of the shell, and ribs extending between and secured to the rearwardly directed portions of the shell, said ribs bearing upon said strip and said web, and said strip bearing upon the forward portions of said compression members; and fastening means extending through the shell and strip and into the compression members for securing the cap section to the main section.

7. An airfoil construction comprising: a spar and a plurality of spaced forwardly extending compression members secured to the spar; a nose cap comprising a shell, a plurality of cap ribs secured to the shell and a strip secured along the inside of the nose portion of the shell; the rear portions of the cap ribs bearing upon the spar and said strip bearing upon the fore portions of the compression members, for transmitting loads between the spar and the nose cap.

8. An airfoil construction comprising: a main section and a nose cap section attachable as a unit to the main section; the main section comprising an upright web and spaced compression members projecting forwardly therefrom; the nose cap section comprising a shell having a nose portion and rearwardly projecting upper and lower portions, and cap ribs secured within the shell; the rear portions of the cap ribs bearing upon said upright web and the nose portion of the shell bearing upon the fore portions of the compression members, for transmitting loads between the main section and the nose cap.

9. An airfoil construction comprising; a main section and a nose cap section attachable as a unit to the main section; the main section comprising an upright web and spaced compression members projecting forwardly therefrom; the nose cap section comprising a shell having a nose portion and rearwardly projecting upper and lower portions, and cap ribs secured within the shell; the rear portions of the cap ribs bearing upon said upright web and the nose portion of the shell bearing upon the fore portions of the compression members, for transmitting loads between the main section and the nose cap; and fastening means connecting said nose portion of the shell and the compression members for attaching the nose cap to the main section.

EDWARD Y. ROBERTS.

REFERENCES CITED

The following references are of record in the file of this patent:

UNITED STATES PATENTS

| Number | Name | Date |
| --- | --- | --- |
| 658,077 | Thomas | Sept. 18, 1900 |
| 1,854,330 | Delage | Apr. 19, 1932 |
| 1,858,194 | Tetlow | May 10, 1932 |
| 1,877,022 | Northrop | Sept. 13, 1932 |
| 1,976,480 | Carleton | Oct. 9, 1934 |
| 2,233,969 | Woods | Mar. 4, 1941 |
| 2,312,546 | Hazard et al. | Mar. 2, 1943 |
| 2,386,170 | Watter | Oct. 2, 1945 |
| 2,430,854 | Berliner | Nov. 18, 1947 |